United States Patent
Kim

(10) Patent No.: US 12,315,217 B2
(45) Date of Patent: May 27, 2025

(54) METHOD AND APPARATUS FOR RECOGNIZING OBJECT

(71) Applicant: ELECTRONICS AND TELECOMMUNICATIONS RESEARCH INSTITUTE, Daejeon (KR)

(72) Inventor: Jin Kyeong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 268 days.

(21) Appl. No.: 17/744,065

(22) Filed: May 13, 2022

(65) Prior Publication Data
US 2022/0375194 A1 Nov. 24, 2022

(30) Foreign Application Priority Data
May 18, 2021 (KR) .......................... 10-2021-0064064

(51) Int. Cl.
*G06V 10/75* (2022.01)
*G06V 10/56* (2022.01)

(52) U.S. Cl.
CPC ............ *G06V 10/751* (2022.01); *G06V 10/56* (2022.01)

(58) Field of Classification Search
CPC ...... G06V 10/751; G06V 10/56; G06V 10/12; G06V 10/19; G06V 10/60; G06V 10/10; G06V 10/40; G06V 10/94
See application file for complete search history.

(56) References Cited

U.S. PATENT DOCUMENTS

| | | | |
|---|---|---|---|
| 8,433,759 B2 | 4/2013 | Styles et al. | |
| 9,002,401 B2 | 4/2015 | Kang et al. | |
| 2005/0240871 A1 | 10/2005 | Wilson | |
| 2011/0001695 A1* | 1/2011 | Suzuki | G06F 3/012 345/7 |
| 2012/0086801 A1* | 4/2012 | Larsen | H04N 13/366 382/106 |
| 2022/0114811 A1* | 4/2022 | Kis | G06V 10/60 |
| 2022/0124294 A1* | 4/2022 | Verma | G06V 10/772 |

FOREIGN PATENT DOCUMENTS

| | | |
|---|---|---|
| KR | 10-1644608 B1 | 8/2016 |
| KR | 20170001434 A | 1/2017 |
| KR | 10-1708460 B1 | 2/2017 |
| KR | 10-1889025 B1 | 8/2018 |
| KR | 10-2019-0009459 A | 1/2019 |

* cited by examiner

*Primary Examiner* — Wassim Mahrouka
(74) *Attorney, Agent, or Firm* — Rabin & Berdo, P.C.

(57) ABSTRACT

Provided are a method and apparatus for recognizing an object. An object recognition method performed by an object recognition apparatus includes receiving reflected light in which light is reflected by a recognition pattern disposed on an object and passes through a lens, identifying the recognition pattern disposed on the object from the reflected light, and comparing the identified recognition pattern with recognition patterns defined for respective objects and determining an object viewed by a user based on a result of the comparison, wherein the recognition pattern is a pattern in which different colors are arranged adjacently.

12 Claims, 6 Drawing Sheets

METHOD AND APPARATUS FOR RECOGNIZING OBJECT

CROSS-REFERENCE TO RELATED APPLICATION

This application claims the benefit of Korean Patent Application No. 10-2021-0064064 filed on May 18, 2021, in the Korean Intellectual Property Office, the entire disclosure of which is incorporated herein by reference for all purposes.

BACKGROUND

1. Field of the Invention

One or more example embodiments relate to a technology for recognizing an object.

2. Description of the Related Art

In recent years, when Bluetooth devices are commonly used in daily life, a large number of Bluetooth devices are being used in various fields in the vicinity. When performing a series of processes for discovering and connecting to Bluetooth devices and receiving/switching services, inconvenience is experienced which starts with an unintuitive Bluetooth device discovery process. This is because a user has to specify a Bluetooth device that the user wants to use by looking only at the names of a list of a plurality of devices created through the Bluetooth device discovery process. When the number of searched Bluetooth devices is large, several devices with the same name are displayed, and it is frequently difficult to specify a device to be used by the user based on the name alone. In particular, it is even more difficult to select and use a specific Bluetooth device while wearing smart glasses, one of the wearable augmented reality devices, while checking the list of nearby Bluetooth devices one by one through the menu screen spread out in front of the user.

As a technology for more easily and intuitively recognizing a number of nearby Bluetooth devices or targets (in the present disclosure, wireless earphones, wireless mice, wireless keyboards, smart TVs, etc. are collectively referred to as devices, and simple billboards or exhibits equipped with Bluetooth beacons, etc. are collectively referred to as targets) while wearing smart glasses, which is one of wearable augmented reality devices, there are a method of calculating an incident angle of a Bluetooth signal from a nearby device or target to specify a device/target whose incident angle is within a specific range, a method of recognizing a device/target in an image through a camera mounted on the smart glasses and machine learning and then specifying the device/target in the front to be looked at for a certain period of time, and the like.

SUMMARY

According to an aspect, there is provided an object recognition method performed by an object recognition apparatus including receiving reflected light in which light is reflected by a recognition pattern disposed on an object and passes through a lens, identifying the recognition pattern disposed on the object from the reflected light, and comparing the identified recognition pattern with recognition patterns defined for respective objects and determining an object viewed by a user based on a result of the comparison, wherein the recognition pattern is a pattern in which different colors are arranged adjacently.

The identified recognition pattern may be determined based on a location in which the object recognition apparatus is located.

The identified recognition pattern may be determined based on a gaze of the user in a state where a location of the object recognition apparatus is fixed.

The recognition pattern may include at least one of different colors, numbers, characters, patterns, and images.

The determining of the object may include determining an object in which the identified recognition pattern is included among the defined recognition patterns as the object viewed by the user.

The determining of the object may include transmitting the identified recognition pattern to objects, and when a response is received from an object in which the identified recognition pattern is included in its defined recognition pattern among the objects, determining the object corresponding to the response as the object viewed by the user.

After the determining of the object, the determined object is configured to be paired with a terminal corresponding to the user, or transmit and receive data to and from the terminal.

After the determining of the object, the determined object is configured to provide or switch to a predetermined function to a terminal corresponding to the user.

According to another aspect, there is provided an object recognition apparatus including a reflected light receiver configured to receive reflected light in which light is reflected by a recognition pattern disposed on an object and passes through a lens, a recognition pattern identifier configured to identify the recognition pattern disposed on the object from the reflected light, and an object determiner configured to compare the identified recognition pattern with recognition patterns defined for respective objects, and determine an object viewed by a user based on a result of the comparison, wherein the recognition pattern is a pattern in which different colors are arranged adjacently.

The identified recognition pattern may be determined based on a location in which the object recognition apparatus is located.

The identified recognition pattern may be determined based on a gaze of the user in a state where a location of the object recognition apparatus is fixed.

The recognition pattern may include at least one of different colors, numbers, characters, patterns, and images.

The object determiner may be configured to determine an object in which the identified recognition pattern is included among the defined recognition patterns as the object viewed by the user.

The object determiner may be configured to transmit the identified recognition pattern to objects, and when a response is received from an object in which the identified recognition pattern is included in its defined recognition pattern among the objects, determine the object corresponding to the response as the object viewed by the user.

After the object determiner determines the object, the determined object may be configured to be paired with a terminal corresponding to the user, or transmit and receive data to and from the terminal.

After the object determiner determines the object, the determined object may be configured to provide or switch to a predetermined function to a terminal corresponding to the user.

Additional aspects of example embodiments will be set forth in part in the description which follows and, in part, will be apparent from the description, or may be learned by practice of the disclosure.

According to an example embodiment, it is possible to provide a method of efficiently specifying a specific target and device in front of or viewed by the user from the the user's location by using a lenticular effect may be provided.

According to an example embodiment, the user wearing an object recognition apparatus gazes at an object to obtain a recognition pattern in which reflected light is refracted by a lenticular, and as a result of a query/response for determining an object corresponding to the obtained recognition pattern, the object is specified. In this intuitive way with minimal user intervention, it is possible to quickly and easily perform processes of pairing/connection setting/service switching/service provision and the like only with the object, excluding other objects.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
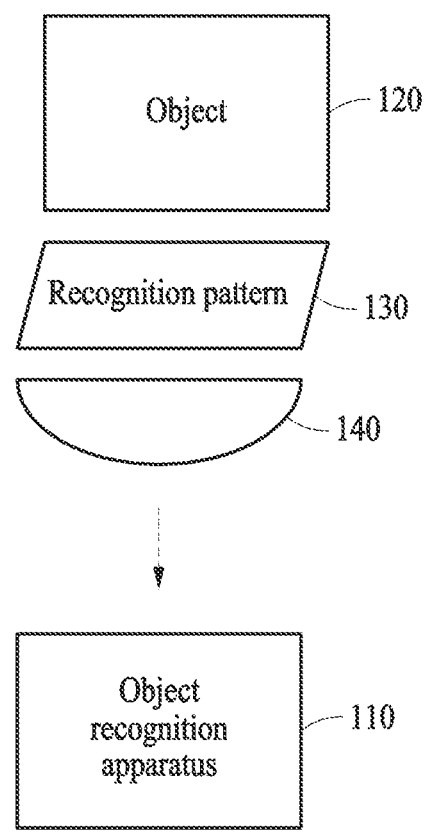
FIG. 1 is a diagram illustrating an outline of an object recognition system according to an example embodiment.

The following structural or functional descriptions of example embodiments described herein are merely intended for the purpose of describing the example embodiments described herein and may be implemented in various forms. Accordingly, the actual implementation form is not limited to the specific example embodiments disclosed, and the scope of the disclosure to include all changes, equivalents, and replacements within the technical scope described in the example embodiments.

Although terms of "first," "second," and the like are used to explain various components, these terms are used only to distinguish one component from another component. For example, a first component may be referred to as a second component, or similarly, the second component may be referred to as the first component.

When it is mentioned that one component is "connected" to another component, it may be understood that the one component is directly connected to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an outline of an object recognition system according to an example embodiment.

The object recognition system may specify the object viewed by the user wearing an object recognition apparatus for a plurality of objects, so that the user terminal may be paired with the object viewed by the user, transmit/receive data, and receive a service.

The object recognition system may provide an object recognition method for specifying the object viewed by the user, using the feature that the recognition pattern identified by the object recognition apparatus varies according to at least one of the position and gaze of the user through the lenticular effect of a lenticular lens.

Referring to FIG. 1, the object recognition system may include an object recognition apparatus 110, an object 120, a recognition pattern 130, and a lens 140.

The object recognition apparatus 110 may be a wearable device such as smart glasses, or other devices according to example embodiments. The object recognition apparatus 110 may be in a state of being carried or worn by a user.

The object 120 may be connected to a user terminal of the user to transmit/receive data and provide a service. The object 120 may also be referred to as a device or a target.

The recognition pattern 130 may include color patterns including different colors. The recognition pattern 130 may include characters, pictures, colors, etc. depending on the example embodiment, but the example embodiment in which the recognition pattern includes a color pattern may be mainly described herein.

The lens 140 may refract the reflected light reflected from the recognition pattern 130. The lens 140 may be a lenticular lens, and the lenticular lens may have a form in which a plurality of convex lenses are arranged. The lenticular lens may refract reflected light reflected from the recognition pattern 130 so that the object recognition apparatus identifies another recognition pattern according to an angle at which the user views the object.

The object recognition apparatus 110 may be mounted on the user looking at the object 120 at a specific angle at a specific location. The object recognition apparatus 110 may identify a recognition pattern seen at the location of the user. The object recognition apparatus 110 may transmit the identified recognition pattern to the objects. The objects may determine whether the recognition pattern identified by the object recognition apparatus 110 is included in the predefined recognition pattern. Among the objects, the object 120 in which the recognition pattern identified by the object recognition apparatus 110 is included in the recognition pattern may transmit a response to the object recognition 110. The object recognition apparatus 110 may determine that the object viewed by the user is the target object 120 based on the response. The object 120 may be paired with the user terminal of the user in a manner such as Bluetooth, or may transmit/receive data.

Figure 2:
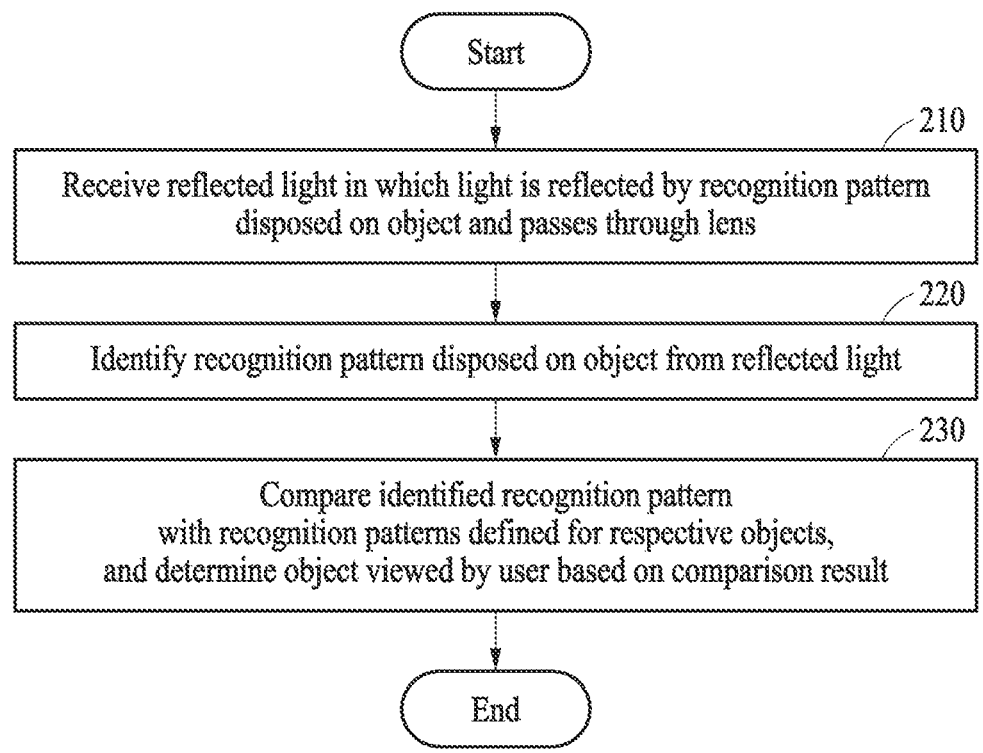
FIG. 2 is a flowchart illustrating an object recognition method according to an example embodiment.

FIG. 2 is a flowchart illustrating an object recognition method according to an example embodiment.

Referring to FIG. 2, in operation 210, an object recognition apparatus may receive reflected light in which light is reflected by a recognition pattern disposed on the object and passed through a lens. The recognition pattern disposed on the object may be a pattern in which different colors are disposed adjacent to each other, and the lens may be the lenticular lens. The recognition pattern may include not only a color pattern, but also at least one of different colors, numbers, characters, patterns, and images according to example embodiments.

In operation 220, the object recognition apparatus may identify a recognition pattern disposed on the object from the reflected light. In other words, the object recognition apparatus may identify a recognition pattern recognized at the location and viewpoint of the object recognition apparatus. In operation 230, the object recognition apparatus may compare the identified recognition pattern with recognition patterns defined for each object, and determine the object viewed by the user based on the comparison result.

Since the reflected light is refracted through the lenticular lens, the identified recognition pattern may be determined based on the location where the object recognition apparatus is located, or based on the gaze of the user in a state in which the location of the object recognition apparatus is fixed. For example, in a state in which the user carrying or wearing the object recognition apparatus is facing the front, the identified recognition pattern may be determined based on the location where the user stands, i.e., the position where the object recognition apparatus is located. Further, in a state in which the user carrying or wearing the object recognition apparatus moves only his/her gaze from one location, the identified recognition pattern may be determined based on the gaze of the user.

The object recognition apparatus may determine the object in which the identified recognition pattern is included in the recognition pattern as the object viewed by the user, in operation 230. The object recognition apparatus may transmit the identified recognition pattern to the objects. The objects may determine whether the received identified recognition pattern is included in the recognition pattern defined for each object. If the identified recognition pattern is included in the defined recognition pattern of an object, the object may transmit a response to the object recognition apparatus.

When the response is received from the object in which the identified recognition pattern is included in the defined recognition pattern among the objects, the object recognition apparatus may determine the object corresponding to the response as the object viewed by the user. After determining the object viewed by the user, the object determined as the object viewed by the user may be paired with a terminal corresponding to the user or may transmit/receive data. The object may be connected to the user terminal through Bluetooth or the like. After determining the object, the determined object may provide or switch a predetermined service or a predetermined function to the terminal corresponding to the user. Here, the user terminal may be an apparatus separate from the object recognition apparatus, or may be the same apparatus as the object recognition apparatus.

Figure 3:
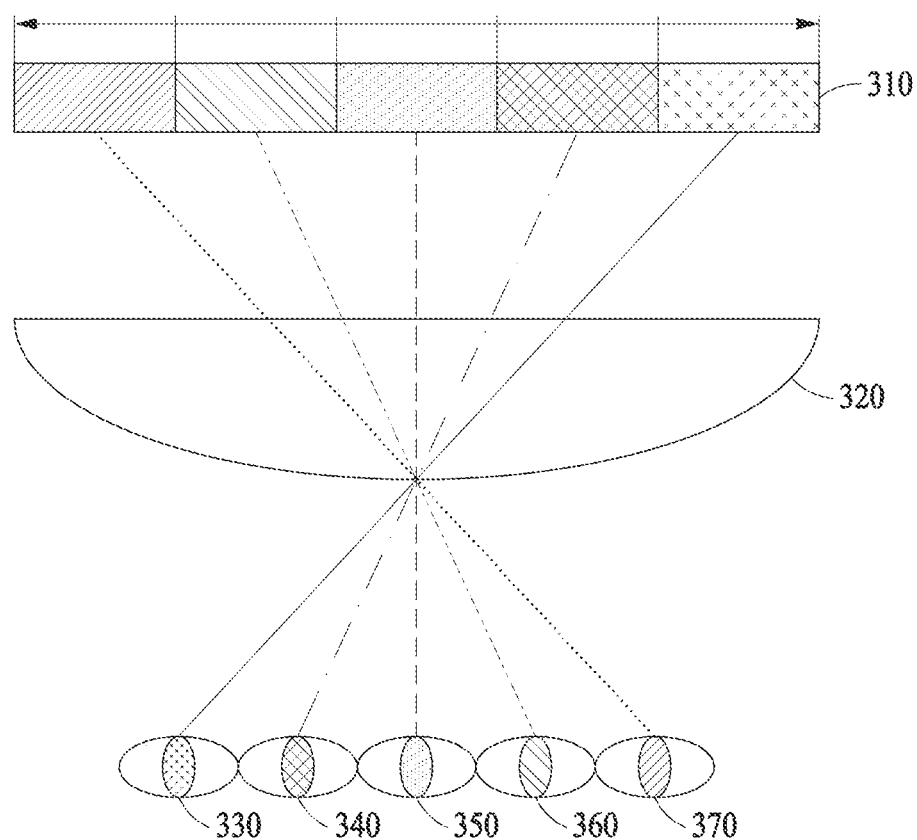
FIGS. 3 to 5 are diagrams illustrating recognition patterns identified according to a gaze and location of a user, according to an example embodiment.
Figure 4:
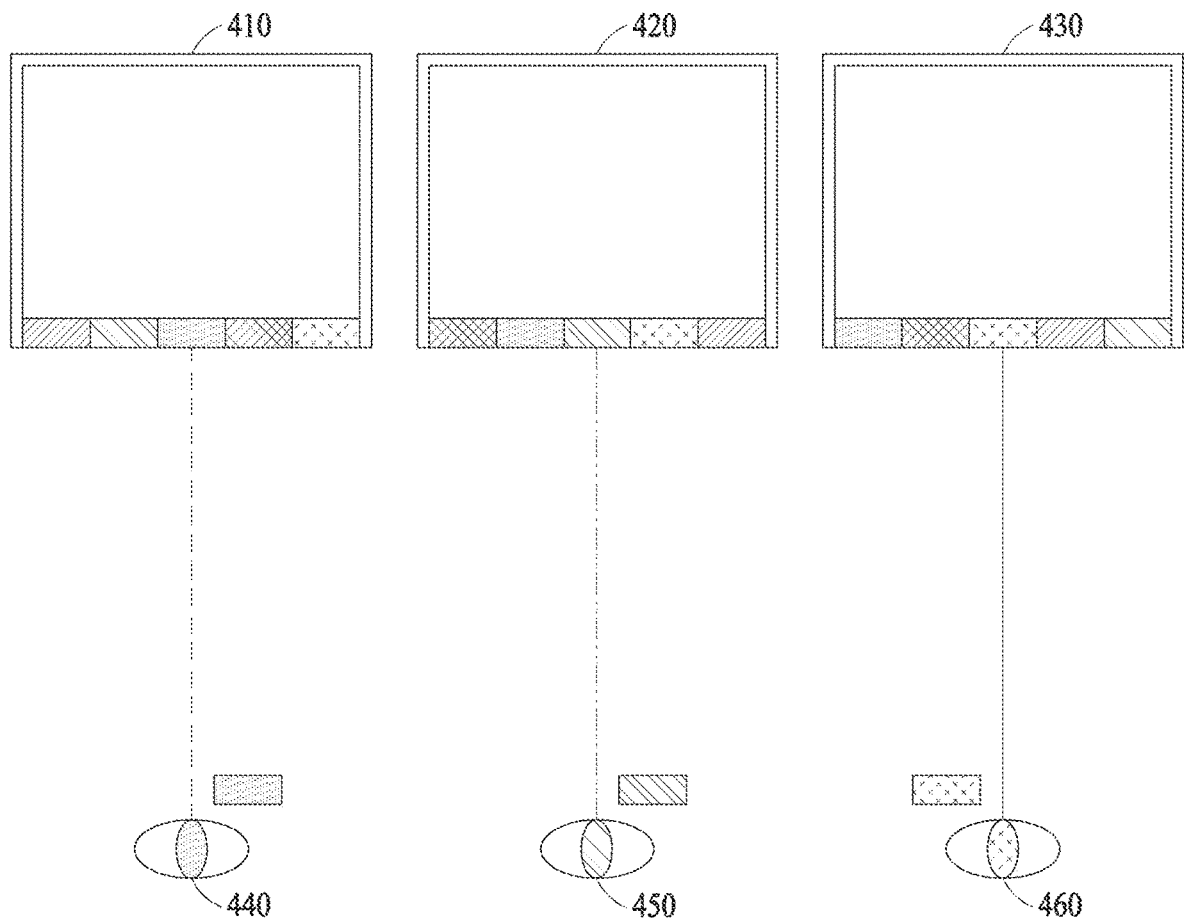
Figure 5:
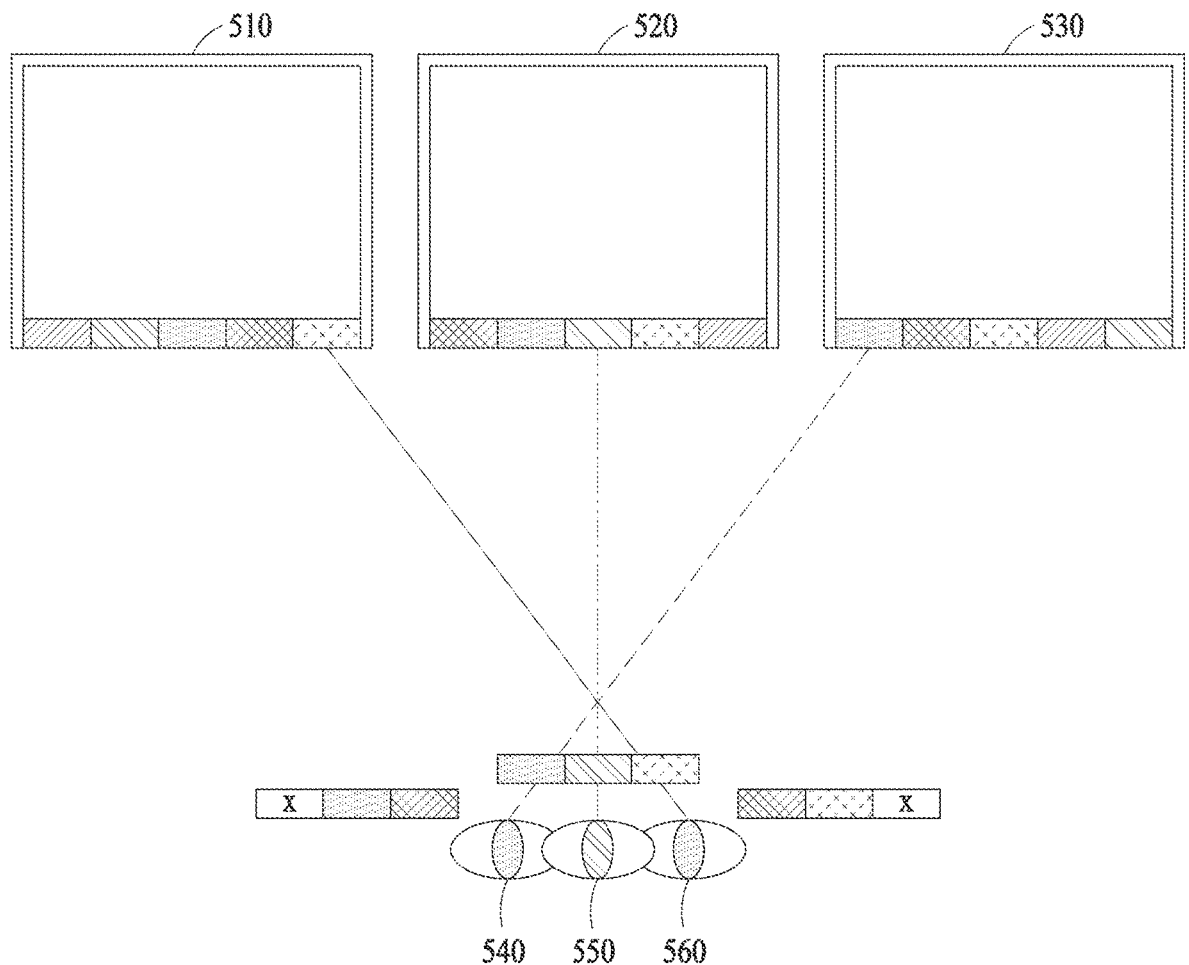

FIGS. 3 to 5 are diagrams illustrating a recognition pattern identified according to a gaze and location of the user, according to an example embodiment.

Although FIGS. 3 to 5 illustrate example embodiments recognizing an object based on a color or recognition pattern identified by the object recognition apparatus from recognition patterns including a plurality of colors, due to the nature of black-and-white drawings, each color may be shown as a pattern on the drawing. For example, in the recognition pattern 310 of FIG. 3, the leftmost pattern may indicate red, the second pattern from the left may indicate black, and the middle pattern may indicate yellow. The second pattern from the right may indicate purple, and the rightmost pattern may indicate green.

FIG. 3 is a diagram illustrating a color identified according to the location and gaze of the user, according to an example embodiment. Referring to FIG. 3, there is a predefined and disposed recognition pattern 310, and a lenticular lens 320 may be attached to the front surface of the recognition pattern 310. When the reflected light reflected from the recognition pattern 310 passes through the lenticular lens 320, the lenticular effect occurs, and the recognition pattern identified by the object recognition apparatus may change based on at least one of a location and a viewpoint of the user wearing the object recognition apparatus. The object recognition apparatus may be a wearable device such as smart glasses or other devices. For example, when the location and gaze of the object recognition apparatus are the same as reference number 330, the object recognition apparatus may recognize the recognition pattern 310 as green. Further, when the location and gaze of the object recognition apparatus are the same as reference number 340, the object recognition apparatus may recognize the recognition pattern 310 as purple, and when the location and gaze of the object recognition apparatus are the same as reference number 350, the object recognition apparatus may recognize the recognition pattern 310 as yellow. When the location and gaze of the object recognition apparatus are the same as reference number 360, the object recognition apparatus may recognize the recognition pattern 310 as black, and when the location and gaze of the object recognition apparatus are the same as reference number 370, the object recognition apparatus may recognize the recognition pattern 310 as red. The object recognition apparatus may recognize only a specific color at one location due to the lenticular effect, and cannot recognize other surrounding colors. One object may determine whether the object viewed by the user wearing the object recognition apparatus is the one object, by using the characteristic of the lenticular effect.

The recognition pattern described herein may specify a target by pointing to the target by the color and the left and right arrangement of the color, but this is only a concept used for convenience of description, and may consist of other distinguishable elements such as letters, numbers, colors, or images. Further, the arrangement pattern of elements used in each method may be configured to specify an object.

FIG. 4 is a diagram illustrating a color identified according to the location of the user.

FIG. 4 may show an example embodiment in which a color identified by the object recognition apparatus is different for objects 410, 420, and 430 having different recognition patterns, based on the location of the user looking only at the front.

If the user carrying or wearing the object recognition apparatus is standing at the location 440, the object recognition apparatus may recognize a yellow color from the recognition pattern of the first object 410. When the user is standing at the location 450, the object recognition apparatus may recognize a black color from the recognition pattern of the second object 420. When the user is standing at the location 460, the object recognition apparatus may recognize a green color from the recognition pattern of the third object 430. Since the user is assumed to look only at the front, even though the recognition patterns of the objects 410, 420, and 430 include a plurality of colors, the user may recognize only one color at one location, particularly the color at the center.

The object recognition apparatus may transmit information about a color recognized at one location to the objects 410, 420, and 430. An object having the same central color of the recognition pattern of the objects 410, 420, and 430 as color information received from the object recognition apparatus may transmit a response to the object recognition apparatus. For example, the object recognition apparatus may recognize green and transmit the recognition of green to the objects 410, 420, and 430. Since green is disposed in the center of the recognition pattern of the third object 430, the third object 430 may transmit a response to the object recognition. In this case, the object recognition apparatus may determine that the apparatus viewed by the user is the third object 430. In this case, the user terminal carried by the user may transmit and receive data only with the third object 430 excluding the first object 410 and the second object 420. When the user terminal and the third object 430 are connected through Bluetooth, pairing may be performed or a service provision and switching process may be performed.

FIG. 5 may indicate an example embodiment in which a recognition pattern identified by the object recognition apparatus is changed based on the gaze of the user moving only the gaze without moving left and right at one location with respect to objects 510, 520, and 530 having different recognition patterns.

When the user carrying or wearing the object recognition apparatus does not move from a specific location and the gaze is the same as reference number 540, the object recognition apparatus may identify a recognition pattern of (X, yellow, purple). The object recognition apparatus may transmit the identified recognition pattern (X, yellow, purple) to the objects 510, 520, and 530. The third object 530 including (X, yellow, purple) in the recognition pattern may transmit a response to the object recognition apparatus by the objects 510, 520, and 530. Based on the response, the object recognition apparatus may determine the object viewed the user at the location of the user as the third object 530.

Further, when the user does not move from a specific location and the gaze is the same as reference number 550, the object recognition apparatus may identify a recognition pattern of (yellow, black, and green). The object recognition apparatus may transmit the identified recognition pattern (yellow, black, green) to the objects 510, 520, and 530. The second object 520 including (yellow, black, green) in the recognition pattern may transmit a response to the object recognition apparatus by the objects 510, 520, and 530. Based on the response, the object recognition apparatus may determine the object viewed the user at the location of the user as the second object 520.

When the user does not move from a specific location and the gaze is the same as reference number 560, the object recognition apparatus may identify a recognition pattern of (purple, green, X). The object recognition apparatus may transmit the identified recognition pattern (purple, green, X) to the objects 510, 520, and 530. The first object 510 including (purple, green, X) in the recognition pattern may transmit a response to the object recognition apparatus by the objects 510, 520, and 530. Based on the response, the object recognition apparatus may determine the object viewed the user at the location of the user as the first object 510.

In the example embodiment of FIG. 5, since yellow, black, and green are all included in the recognition patterns of the objects 510, 520, and 530, it may be difficult to determine the object viewed by the user using only one color that the object recognition apparatus may identify from the location and gaze of the user. Accordingly, the object recognition apparatus may clarify which object the recognition pattern identified by the object recognition apparatus corresponds to by identifying a recognition pattern including a plurality of colors from a predefined recognition pattern.

Figure 6:
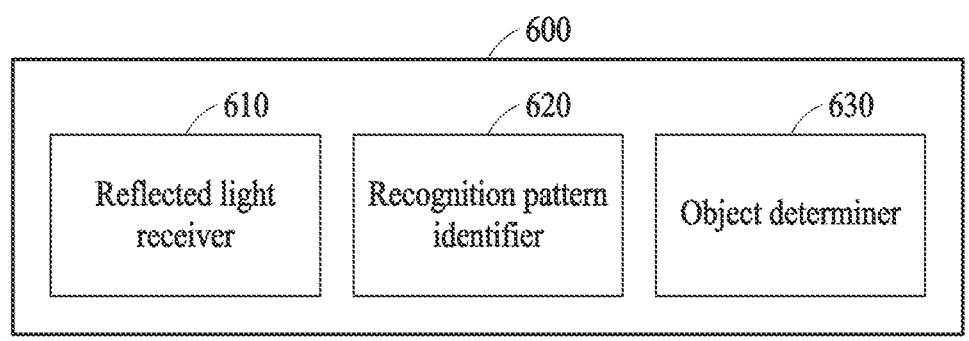
FIG. 6 is a diagram illustrating a configuration of an object recognition apparatus according to an example embodiment.

FIG. 6 is a diagram illustrating a configuration of an object recognition apparatus according to an example embodiment.

Referring to FIG. 6, an object recognition apparatus 600 (e.g., the object recognition apparatus 110 of FIG. 1) may include a reflected light receiver 610, a recognition pattern identifier 620, and an object determiner 630. Here, the object recognition apparatus 600 may correspond to the object recognition apparatus described herein.

The reflected light receiver 610 may receive the reflected light in which light is reflected by a recognition pattern disposed on the object and passed through a lens. The recognition pattern identifier 620 may identify a recognition pattern disposed on the object from the reflected light.

The object determiner 630 may compare the identified recognition pattern with recognition patterns defined for each object, and determine the object viewed by the user based on the comparison result. The object determiner 630 may determine the object in which the identified recognition pattern is included in the defined recognition pattern as the object viewed by the user. The object determiner 630 may transmit the identified recognition pattern to the objects, and when a response is received from the object in which the identified recognition pattern is included in the defined recognition pattern among the objects, determine the object corresponding to the response as the object viewed by the user.

According to an example embodiment, the object recognition apparatus 600 may include a processor (not shown) and a memory (not shown), and the processor may perform operations and/or functions performed by the recognition pattern identifier 620 and the object determiner 630. The memory may store various data used by components of the object recognition apparatus 600. Data may include, for example, input data or output data for software and instructions related thereto. The memory may include one or more of volatile memory and non-volatile memory.

The processor may execute instructions for performing an operation of the object recognition apparatus 600. The processor may, for example, execute software to control at least one other component (e.g., a hardware or software component) of the object recognition apparatus 600 connected to the processor, and may perform various data processing or operations. The processor may perform one or more operations described or illustrated herein in connection with object recognition.

According to an example embodiment, as at least part of a data processing or operation, the processor may store instructions or data in a memory, process the instructions or data stored in the memory, and store the resulting data in a memory or storage apparatus (not shown). The processor may include a main processor (e.g., a central processor or an application processor) or a secondary processor (e.g., a graphic processing unit, a neural processing unit (NPU)) that can be operated independently or in conjunction with the main processor.

The described hardware devices may be configured to act as one or more software modules in order to perform the operations of the above-described example embodiments, or vice versa.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

While this disclosure includes example embodiments, it will be apparent to one of ordinary skill in the art that various changes in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other example embodiments, and equivalents to the claims are also within the scope of the appended claims.

What is claimed is:

1. An object recognition method performed by an object recognition apparatus, comprising:
   receiving reflected light in which light is reflected by a recognition pattern disposed on an object and passes through a lenticular lens;
   identifying the recognition pattern disposed on the object from the reflected light;
   comparing the identified recognition pattern with recognition patterns defined for respective objects; and
   determining an object viewed by a user based on a result of the comparison,
   wherein the recognition pattern is a pattern in which different colors are arranged adjacently,
   wherein the lenticular lens refracts the reflected light, allowing the object recognition apparatus to identify the recognition pattern that changes color depending on an angle at which the user views the object, and
   wherein the determining of the object comprises:
   recognizing a color from the recognition pattern;
   transmitting information about the recognized color to a plurality of objects; and
   when a response is received from an object in which the recognized color is included in the recognition pattern among the plurality of objects, determining the object corresponding to the response as the object viewed by the user.

2. The object recognition method of claim 1, wherein the identified recognition pattern is determined based on a location in which the object recognition apparatus is located.

3. The object recognition method of claim 1, wherein the identified recognition pattern is determined based on a gaze of the user in a state where a location of the object recognition apparatus is fixed.

4. The object recognition method of claim 1, wherein the determining of the object comprises determining an object in which the identified recognition pattern is included among the defined recognition patterns as the object viewed by the user.

5. The object recognition method of claim 1, wherein, after the determining of the object, the determined object is configured to be paired with a terminal corresponding to the user, or transmit and receive data to and from the terminal.

6. The object recognition method of claim 1, wherein, after the determining of the object, the determined object is configured to provide or switch to a predetermined function to a terminal corresponding to the user.

7. An object recognition apparatus comprising:
   a lenticular lens; and
   a processor configured to determine an object viewed by a user based on
   reflected light in which light is reflected by a recognition pattern disposed on an object and passes through the lenticular lens,
   wherein the processor is further configured to:
   identify the recognition pattern disposed on the object from the reflected light, and
   compare the identified recognition pattern with recognition patterns defined for respective objects, and determine an object viewed by a user based on a result of the comparison,
   wherein the recognition pattern is a pattern in which different colors are arranged adjacently,
   wherein the lenticular lens refracts the reflected light, allowing the object recognition apparatus to identify the recognition pattern that changes color depending on an angle at which the user views the object, and
   wherein the processor is further configured to:
   recognize a color from the recognition pattern,
   transmit information about the recognized color to a plurality of objects, and
   when a response is received from an object in which the recognized color is included in the recognition pattern among the plurality of objects, determine the object corresponding to the response as the object viewed by the user.

8. The object recognition apparatus of claim 7, wherein the identified recognition pattern is determined based on a location in which the object recognition apparatus is located.

9. The object recognition apparatus of claim 7, wherein the identified recognition pattern is determined based on a gaze of the user in a state where a location of the object recognition apparatus is fixed.

10. The object recognition apparatus of claim 7, wherein the processor is further configured to determine an object in which the identified recognition pattern is included among the defined recognition patterns as the object viewed by the user.

11. The object recognition apparatus of claim 7, wherein, after the processor determines the object, the determined object is configured to be paired with a terminal corresponding to the user, or transmit and receive data to and from the terminal.

12. The object recognition apparatus of claim 7, wherein, after the processor determines the object, the determined object is configured to provide or switch to a predetermined function to a terminal corresponding to the user.

\* \* \* \* \*